United States Patent [19]

Miyata et al.

[11] Patent Number: 5,151,455

[45] Date of Patent: * Sep. 29, 1992

[54] FLAME RETARDANT AND FLAME RETARDANT RESIN COMPOSITION

[75] Inventors: Shigeo Miyata, Takamatsu; Makoto Yoshii, Kokubunji, both of Japan

[73] Assignee: Kyowa Chemical Industry, Kagawa, Japan

[*] Notice: The portion of the term of this patent subsequent to Jul. 23, 2008 has been disclaimed.

[21] Appl. No.: 550,364

[22] Filed: Jul. 10, 1990

[30] Foreign Application Priority Data

Jul. 10, 1989 [JP] Japan .................. 1-177763

[51] Int. Cl.$^5$ .............................. C08K 9/02
[52] U.S. Cl. ................... 523/200; 524/141; 524/147; 524/148; 524/151; 524/436
[58] Field of Search ........... 524/141, 147, 148, 151, 524/436; 252/609

[56] References Cited

U.S. PATENT DOCUMENTS

| | | | |
|---|---|---|---|
| 3,247,134 | 4/1966 | Hwa et al. | 524/145 |
| 4,098,762 | 7/1978 | Miyata et al. | 524/400 |
| 4,126,593 | 11/1978 | Takahashi | 524/436 |
| 4,251,436 | 2/1981 | Silberberg et al. | 524/145 |
| 4,721,746 | 1/1988 | Tashiro et al. | 524/145 |
| 4,851,463 | 7/1989 | Opsahl et al. | 524/114 |

FOREIGN PATENT DOCUMENTS 63-265960 11/1988 Japan .
64-40541 2/1989 Japan .

Primary Examiner—Paul R. Michl
Assistant Examiner—Edward J. Cain
Attorney, Agent, or Firm—Wenderoth, Lind & Ponack

[57] ABSTRACT

A flame retardant having excellent resistance to water and acid for a long period of time and comprising 100 parts by weight of magnesium hydroxide of which the surface is treated with a phosphoric ester of formula (I)

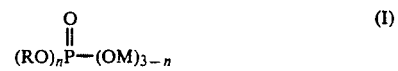

wherein R represents an alkyl or alkenyl group having 10 to 30 carbon atoms, M represents an atom belonging to group IA of the periodic table or $NH^{4+}$, and n represents 1 or 2, and 0.1 to 10 parts by weight of a salt of a metal other than alkali metals with a higher fatty acid, and a resin composition containing the flame retardant.

7 Claims, No Drawings

FLAME RETARDANT AND FLAME RETARDANT RESIN COMPOSITION

FIELD OF THE INVENTION

This invention relates to a flame retardant and a flame retardant resin composition containing said flame retardant and having excellent resistance to water and acids and excellent moldability. More specifically, it relates to a flame retardant comprising a magnesium hydroxide of which the surface is treated with phosphoric esters and a metal salt of a higher fatty acid, and a flame retardant resin composition containing said flame retardant.

DESCRIPTION OF THE PRIOR ART

Synthetic resins have been conventionally rendered flame-retardant by incorporating an organic halide therein. When fire breaks out, however, such flame retardant resins not only give off a large volume of smoke but also emit toxic and corrosive gases. Therefore, this flame-retarding method has problems in that people are harmed and that malfunctions are caused on machinery and equipment from such products. Another method has been also proposed which comprises incorporating aluminum hydroxide into synthetic resins. However, this method has a problem in that the aluminum hydroxide foams by decomposition when the resins are processed and molded.

In order to overcome these problems, a method which comprises incorporating magnesium hydroxide has been proposed. That is, a magnesium hydroxide proposed by the present inventors (JP-B-63-48809), which is formed of comparatively well grown crystals having a BET specific surface area of not more than 20 m$^2$/g and a crystal strain, in the $<101>$ direction, of not more than $3.0 \times 10^{-3}$ and which is nearly free from aggregation, is surface treated with a higher fatty acid and used as a flame retardant (JP-B-60-57457). The magnesium hydroxide obtained by this method is widely used as a flame retardant for communication cables, power cables, housings of electric appliances, etc.

In some cases, molded articles of synthetic resins are immersed in, or exposed to, water or acid water for a long period of time. And, in such a case, even if molded articles contain a flame retardant composed mainly of the magnesium hydroxide obtained by the above method, it cannot be said that those molded articles have sufficient resistance to water and acids.

The present inventors have proposed a method (U.S. patent application, Ser. No. 07/394,418) now U.S. Pat. No. 5,034,442 to overcome the above problem, whereby the resistance to water and acids is improved to a considerable extent by using a flame retardant obtained by surface-treating magnesium hydroxide with esters formed of phosphoric acid and a higher alcohol.

Molded articles of synthetic resins are sometimes required to have properties for resistance to water and acid, i.e. their insulation resistance should be nearly the same as that at an initial time even if they are immersed in or in contact with warm water or acid water for a long period of time, e.g., 12 weeks or more, or they should not be substantially dissolved in carbonic acid water for a long period of time. However, even the magnesium hydroxide obtained by the above method does not fully satisfy the requirements concerning resistance to water and acids.

SUMMARY OF THE INVENTION

It is an object of this invention to provide a flame retardant having excellent resistance to water and acids for a long period of time, and a resin composition containing said flame retardant and having excellent resistance to water and acids and excellent moldability.

It is also an object of this invention to provide a synthetic resin molded article having excellent mechanical strength.

According to this invention, there is provided a flame retardant comprising 100 parts by weight of magnesium hydroxide of which the surface is treated with a phosphoric ester of the following formula (I)

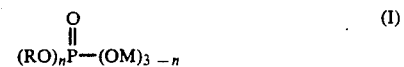

wherein R represents an alkyl or alkenyl group having 10 to 30 carbon atoms, M represents an atom belonging to group IA of the periodic table or NH$^{4+}$, and n represents 1 or 2, and about 0.1 to 10 parts by weight of a salt of a metal other than alkali metals and a higher fatty acid.

Further, according to this invention, there is provided a flame retardant resin composition which comprises 100 parts by weight of a synthetic resin and 10 to 250 parts by weight of the above flame retardant.

DETAILED DESCRIPTION OF THE INVENTION

When phosphoric esters for use in this invention contain an alkyl or alkenyl group having a larger number of carbon atoms, or when they contain an alkyl group rather than the alkenyl group, the resultant flame retardant tends to have higher resistance to water and acids. In the formula (I), the alkali metal represented by M may be one member selected from the alkali metals or a mixture of these. When M is H, the resultant acidic phosphoric ester may be that which is neutralized with an amine such as diethanol amine, or the like. And, a diester tends to give better resistance to water and acid than a monoester. The alkyl and alkenyl groups, and the number of carbon atoms therefor may be selected as required depending upon a purpose in use.

The amount of the phosphoric ester, which is a surface-treating agent, is 0.1 to 10% by weight, preferably 1 to 5% by weight based on the magnesium hydroxide. When the amount of the surface-treating agent is less than the above lower limit, it is difficult to obtain a satisfactory effect on improvement in resistance to water and acids. And, even when it is more than the above upper limit, the effect on improvement in resistance to water and acid cannot be promoted any further, and, undesirably, the mechanical strength (tensile strength, Izod impact strength, etc.) and flame retardancy of a molded article of a synthetic resin composition containing such a flame retardant are reduced. The optimum amount of the phosphoric ester is an amount in which the surfaces of crystals of the magnesium hydroxide are entirely covered by chemical bond to the phosphoric ester.

The magnesium hydroxide is surface-treated with a phosphoric ester in the following manner.

At first, a suspension of magnesium hydroxide in water, an alcohol, acetone, benzene, or the like is preliminarily maintained at a higher temperature than that at which the phosphoric ester can be dissolved. Then, while the suspension is stirred, a solution of a phosphoric ester in water, an alcohol, acetone, benzene, or the like is added, and these components are fully mixed. Or, a solution of a phosphoric ester in water, an alcohol, acetone, benzene, or the like may be added to a magnesium hydroxide powder while the resulting mixture is stirred. The former method is preferred in view of uniformity and completeness of surface treatment.

The surface-treated magnesium hydroxide is then dehydrated, dried and granulated, or dehydrated, granulated and dried.

It is assumed that the phosphoric ester covers the surfaces of magnesium hydroxide crystals by bonding to Mg on the surfaces by forming the following chemical bonds, and that the RO groups projecting on the surface exhibit high resistance to water and acids.

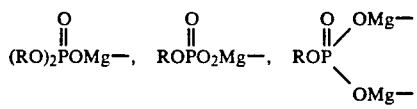

This surface-treated magnesium hydroxide exhibits excellent resistance to water and acids for about one to four weeks. However, it cannot maintain such initial excellent resistance to water and acids any more if it passes a long period of time, e.g. 10 to 25 weeks.

The present inventors have eagerly investigated causes therefor, and found that a synthetic resin to which this surface-treated magnesium hydroxide has been incorporated has poor melt-fluidity at a resin processing or molding time as compared with a resin to which a magnesium hydroxide of which the surfaces are treated with a higher fatty acid has been incorporated, and the smoothness of a molded article is therefore deteriorated. Further, a number of cracks are observed between resin and magnesium hydroxide on the surface of the molded article. It is therefore assumed that when such a molded article is kept in contact with water or acidic water for a long period of time, the water or acidic water penetrates the molded article and dissolves the magnesium hydroxide covered with a phosphoric ester, although this penetration and dissolution proceed quite slowly.

According to the above-acquired knowledge and assumption, the present inventors have continued the study of flame retardants, and arrived at the flame retardant of this invention in which a magnesium hydroxide of which the surface is treated with a phosphoric ester and a metal salt of a higher fatty acid are used in combination.

The metal salt of a higher fatty acid used in this invention (from which alkali metal salts are excluded) is a metallic soap formed of metal (Be, Mg, Ca, Sr, Ba, Al, Ti, Mn, Fe, Co, Ni, Cu, Zn, Ag, Cd, Sn, Pb, etc.) and a higher fatty acid having about 10 to 30 carbon atoms and represented by general formula $R^1COOH$ in which $R^1$ is an aliphatic hydrocarbon moiety. In addition, the alkali metal salts are undesirable since they deteriorate water resistance. Preferred examples of the higher fatty acid are lauric acid, palmitic acid, behenic acid, montanic acid, oleic acid, linolic acid, ricinoleic acid, etc. Preferred metal salts are salts (soaps) of a saturated linear aliphatic acid having 15 carbon atoms or more and metal such as Mg, Zn, Ca, or the like.

Magnesium hydroxide having well-grown crystals and being nearly free from aggregation is preferred in this invention. That is, preferred is magnesium hydroxide having a BET specific surface area of 1 to 20 m$^2$/g, a crystal strain, in the <101> direction, of not more than $3.0 \times 10^{-3}$ and a secondary particle diameter, determined by particle size distribution measurement, of not more than 2 μm, preferably not more than 1 μm. The use of such magnesium hydroxide makes it possible to provide a molding resin composition preferred in view of all of the following properties, processability, moldability, appearance of a molded article, mechanical strength, electric properties, and the like.

The resin used in the flame retardant resin composition of this invention may be any of those which can be molded.

Examples of such a resin are olefin polymers such as polyethylene, polypropylene, polybutene-1, poly-4-methylpentene-1, ethylene/propylene copolymer, ethylene/butene-1 copolymer, ethylene/4-methylpentene-1 copolymer, propylene/butene-1 copolymer, propylene/4-methylpentene copolymer, ethylene/propylene/diene copolymer, post-chlorination products of these, etc.; styrene polymer or copolymers such as polystyrene, ABS (acrylonitrile/butadiene/styrene), AAS (acrylonitrile-acrylic styrene), AES (acrylonitrile/EPDM (ethylene-propylene/diene terpolymer)/styrene, AS (acrylonitrile/styrene), etc.; vinyl chloride or vinyl acetate-type polymers or copolymers such as vinyl chloride resin, vinyl acetate resin, vinylidene chloride resin, ethylene/vinyl chloride copolymer, ethylene/vinyl acetate copolymer, post-chlorinated products of these, etc.; phenoxy resin; butadiene resin; fluorine resin; polyacetal resin; polyamide resin; polyamideimide resin; polyarylate resin; polyurethane resin; polyesters such as polyethylene terephthalate, polybutylene terephthalate, etc.; polycarbonate resin, polysulfone resin; polyphenylene oxide resin, thermoplastic resins such as methacrylic resin, etc.; thermosetting resins such as diallylphthalate resin, vinyl ester resin, phenolic resin, unsaturated polyester resin, polyurethane resin, melamine resin, urea resin, epoxy resin, alkyd resin, etc.; and synthetic rubbers such as ethylene/propylene/diene terpolymer, styrene/butadiene rubber, butadiene rubber, IR, EPM, nitrile butadiene rubber, CR, isobutylene/isoprene rubber, fluorine rubber, butyl rubber, isoprene rubber, urethane rubber, acrylic rubber, chloroprene rubber, chlorosulfonated polyethylene rubber, epichlorohydrin rubber, etc.

The mixing ratio (by weight) between the magnesium hydroxide of which the surface is treated with the phosphoric ester and the metal salt of a higher fatty acid is 100:0.1~10, preferably 100:0.5~5. When the proportion of the metal salt of a higher fatty acid is less than the above range, it is difficult to achieve the object of this invention, improvement and maintenance of resistance to water and acids for a long period of time. Further, since the melt flow index of the resin is hardly improved, the effects of improvement in operationability at a molding time and improvement in appearance of a molded article (surface gloss) are hardly obtained. When the proportion of the metal salt of a higher fatty acid is over the above range, the amount of the magnesium hydroxide as a main component of the flame retardant is relatively small, and as a result, the effect of imparting flame retardancy is reduced.

The flame retardant resin composition of this invention contains about 10 to 250 parts by weight, based on 100 parts by weight of the resin, of the flame retardant comprising a mixture of the magnesium hydroxide of which the surface is treated with the surface treating agent with the metal salt of the higher fatty acid. When the amount of the flame retardant is less than the above lower limit, the effect of imparting the flame retardancy is insufficient. When said amount exceeds the above upper limit, the processability and moldability of the resultant resin composition and the mechanical strength of the resultant molded article such as impact strength, etc., are undesirably and appreciably reduced.

The flame retardant resin composition of this invention may contain other conventional additives. Examples of such additives are an antioxidant, UV light absorber, antistatic agent, lubricant, pigment, foaming agent, plasticizer, filler, reinforcing agent, organohalogen flame retardant, carbon black, tin, tin compound, flame retardant auxiliaries such as phosphorus, etc., crosslinking agent, and the like.

The flame retardant resin composition of this invention can be produced by an ordinary kneading method using a roll, Banbury mixer, kneader, single-screw extruder, twin-screw extruder, or the like.

According to this invention, there is provided a flame retardant resin composition excellent in resistance to water and acids and moldability, and a flame retardant for use in the flame retardant resin composition.

According to this invention, there is also provided a molded article having excellent mechanical strength.

This invention will be explained further in detail hereinbelow by reference to specific Examples.

The methods for measurement of a BET specific surface area, etc., are as follows.

BET specific surface area: The measurement was made according to a liquid nitrogen adsorption method.

Average secondary particle diameter: The measurement was made with a microtrack (made by Nikkiso K.K.) after a slurry of 1 wt. % magnesium hydroxide in water was treated with ultrasonic waves for three minutes.

Resistance to water and acids: Two test pieces having a size of $127 \times 13 \times 3.2$ mm were immersed in 500 ml of deionized water, carbonic acid gas was then blown thereinto continuously at 24° C. for 30 days, and Mg ions eluted into the water were measured by atomic absorption spectroscopy.

Fire retardancy: The measurement was made on test pieces having a thickness of ⅛ inch according to UL 94.

Volume resistivity: A test piece was immersed in warm water having a temperature of 75° C., taken out at constant intervals, and allowed to stand for 30 minutes under an atmosphere having a temperature of 23° C. and a relative humidity of 50%, a voltage of 600 V was then applied, and currents and voltages were measured. On the basis of the currents and voltages, the resistivity was calculated.

Melt-flow index (MFI): The measurement was made according to JIS K7210.

Crystal strain in the <101> strain: The measurement was made according to the method described in U.S. Pat. No. 4,145,404 issued to the present inventor.

In the following Examples, "%" stands for "% by weight", and "part" for "part by weight" unless otherwise specified.

EXAMPLES 1-3

Two kilograms of a magnesium hydroxide powder having a BET specific surface area of 10 m$^2$/g, an average secondary particle diameter of 0.6 μm and a crystal strain, in the <101> direction, of $1.6 \times 10^{-3}$ was suspended in about 20 l of water, and the suspension was warmed to about 70° C. with stirring. Separately, 60 g (equivalent to 3% of the amount of the magnesium hydroxide) of sodium distearin phosphate, $(C_{18}H_{37}O)_2P(O)ONa$, was added to 1 l of warm water having a temperature of about 70° C., and dissolved.

The latter aqueous solution was added to the former magnesium hydroxide slurry with stirring, and the resultant mixture was fully stirred to carry out surface treatment. Then, the mixture was dehydrated under reduced pressure, and the remainder was washed with water and then dried to give a magnesium hydroxide treated with the phosphoric ester.

100 Parts of polypropylene, 135 parts of the surface-treated magnesium hydroxide, 1 part (Example 1), 2 parts (Example 2) or 7 parts (Example 3), based on 100 parts of the surface-treated magnesium hydroxide, of magnesium stearate, and 0.2 part of an antioxidant were uniformly mixed, and the mixture was then melt-kneaded by using a twin-screw extruder at 230° C.

The resultant pellets in these Examples were dried under vacuum at 120° C. for 2 hours, and injection molded into test pieces at 230° C., respectively. The test pieces were measured for various properties.

Table 1 shows the results.

COMPARATIVE EXAMPLE 1

Example 1 was repeated except that no magnesium stearate was used, whereby test pieces were prepared. The test pieces were measured for their properties.

Table 1 shows the results.

COMPARATIVE EXAMPLE 2

The procedure for the surface treatment of magnesium hydroxide in Example 1 was repeated except that sodium stearate in the same amount as that of the phosphoric ester in Example 1 was used in place of the phosphoric ester.

Then, the preparation of a resin composition and test pieces in Example 1 was repeated except that no magnesium stearate was added. The resultant test pieces were measured for their properties.

Table 1 shows the results.

COMPARATIVE EXAMPLES 3-4

Example 1 was repeated except that the amount of magnesium stearate based on 100 parts of surface-treated magnesium hydroxide was changed to 0.2 part (Comparative Example 3) or 15 parts (Comparative Example 4). The resultant test pieces were measured for their properties.

Table 1 shows the results.

EXAMPLES 4-7

Two kilograms of a magnesium hydroxide having a BET specific surface area of 13 m$^2$/g, an average secondary diameter of 0.48 μm and a crystal strain, in the <101> direction, of $2.2 \times 10^{-3}$ was suspended in 20 l of water, and the suspension was warmed to about 70° C. with stirring. Separately, 60 g (equivalent to 3% of the amount of the magnesium hydroxide) of a mixture of potassium dipalmitin phosphate, $(C_{17}H_{35}O)_2P(O)OK$, with potassium monopalmitin phosphate, $(C_{17}H_{35}O)P(O)(OK)_2$, was added to and dissolved in 2 l of water having a temperature of about 70° C. The latter aqueous solution was dissolved in the former magnesium hydroxide slurry, and the mixture was fully stirred to carry out surface treatment of the magnesium hydroxide. The mixture was dehydrated under reduced pressure, and the remainder was washed with water and dried.

150 Parts of polypropylene, 135 parts of the surface-treated magnesium hydroxide, 2 parts, based on 100 parts of the surface-treated magnesium hydroxide, of aluminum stearate (Example 4), zinc stearate (Example 5), calcium palmitate (Example 6) or copper arachate (Example 7), and 0.2 part of an antioxidant were uniformly mixed, and thereafter, the procedure of Example 1 for the preparation of test pieces was repeated. The test pieces were measured for various properties.

Table 1 shows the results.

TABLE 1

|  | Metal salt of higher fatty acid | | Melt flow index (g/10 min) | Flame retardancy | Resistance to water and acids (Eluted MgO, ppm) | Electric insulation property after immersion for: | |
|---|---|---|---|---|---|---|---|
|  | Name | Amount* |  |  |  | 4 weeks ($\Omega \cdot cm$) | 30 weeks ($\Omega \cdot cm$) |
| Example 1 | Mg stearate | 1 | 6.0 | V-0 | 9.2 | $8.5 \times 10^{15}$ | $7.6 \times 10^{15}$ |
| Example 2 | Mg stearate | 2 | 7.6 | V-0 | 7.5 | $9.6 \times 10^{15}$ | $8.2 \times 10^{15}$ |
| Example 3 | Mg stearate | 7 | 12.4 | V-0 | 10.3 | $8.0 \times 10^{15}$ | $6.5 \times 10^{15}$ |
| C. Example 1 | nil | — | 4.4 | V-0 | 105 | $3.0 \times 10^{15}$ | $8.6 \times 10^{14}$ |
| C. Example 2 | nil | — | 5.2 | V-0 | 780 | $6.8 \times 10^{14}$ | $1.4 \times 10^{13}$ |
| C. Example 3 | Mg stearate | 0.2 | 5.0 | V-0 | 91 | $4.2 \times 10^{15}$ | $7.8 \times 10^{14}$ |
| C. Example 4 | Mg stearate | 15 | 21.0 | V-2 | 16.1 | $7.6 \times 10^{15}$ | $1.1 \times 10^{15}$ |
| Example 4 | Al stearate | 2 | 5.8 | V-0 | 7.8 | $9.1 \times 10^{15}$ | $6.7 \times 10^{15}$ |
| Example 5 | Zn stearate | 2 | 7.8 | V-0 | 8.4 | $8.2 \times 10^{15}$ | $6.0 \times 10^{15}$ |
| Example 6 | Ca palmitate | 2 | 7.6 | V-0 | 9.6 | $7.5 \times 10^{15}$ | $5.5 \times 10^{15}$ |
| Example 7 | Cu arachate | 2 | 6.8 | V-0 | 8.7 | $8.8 \times 10^{15}$ | $6.4 \times 10^{15}$ |

*Note: The amount of the metal salt of higher fatty acid is based on 100 parts by weight of surface-treated magnesium hydroxdide.

What is claimed is:

1. A flame retardant comprising 100 parts by weight of magnesium hydroxide which is surface-treated with a phosphoric ester of formula (I)

$$(RO)_nP\!\!-\!\!(OM)_{3-n} \quad (I)$$

wherein R represents an alkyl or alkenyl group having 10 to 30 carbon atoms, M represents an atom belonging to group IA of the periodic table or $NH^{4+}$, and n represents 1 or 2, and 0.1 to 10 parts by weight of a salt of a metal other than alkali metals with a higher fatty acid.

2. A flame retardant according to claim 1, wherein the magnesium hydroxide is that which is surface-treated with 0.1 to 10% by weight, based on the weight of the magnesium hydroxide, of the phosphoric ester.

3. A flame retardant according to claim 1, wherein the higher fatty acid is a fatty acid having 10 to 30 carbon atoms.

4. A flame retardant according to claim 1, wherein the higher fatty acid is a saturated linear aliphatic fatty acid having 15 to 30 carbon atoms.

5. A flame retardant according to claim 1, wherein the magnesium hydroxide has a BET specific surface area of 1 to 20 m²/g and an average secondary particle diameter of not more than 2 μm.

6. A flame retardant according to claim 1, wherein the magnesium hydroxide has a crystal strain, in the <101> direction, of not more than $3.0 \times 10^{-3}$.

7. A flame retardant resin composition comprising 10 to 250 parts by weight of the flame retardant recited in claim 1 and 100 parts by weight of a synthetic resin.

* * * * *